United States Patent [19]

Matsumoto et al.

[11] Patent Number: 6,014,496
[45] Date of Patent: Jan. 11, 2000

[54] MOVING PICTURE CODING METHOD, MOVING PICTURE CODING APPARATUS AND MOVING PICTURE CODING PROGRAM RECORDING MEDIUM

[75] Inventors: Takao Matsumoto, Izumishi; Aki Yoneda, Neyagawashi, both of Japan

[73] Assignee: Matsushita Electric Industrial Co., Ltd., Japan

[21] Appl. No.: 08/960,573

[22] Filed: Oct. 29, 1997

[30] Foreign Application Priority Data

Oct. 31, 1996 [JP] Japan .................................. 8-289580

[51] Int. Cl.[7] ............................... H04N 5/76; H04N 7/26
[52] U.S. Cl. ........................................ 386/109; 386/111
[58] Field of Search ..................... 386/46, 33, 111–112, 386/109; 348/390, 409–412; 382/232, 236, 238; H04N 5/76, 5/92, 7/26

[56] References Cited

U.S. PATENT DOCUMENTS 4,680,647  7/1987  Moriyama ............................. 386/112
5,724,475  3/1998  Kirsten ................................. 386/109
5,835,149  11/1998 Astle .................................... 348/419

*Primary Examiner*—Thai Tran
*Attorney, Agent, or Firm*—Parkhurst & Wendel, L.L.P.

[57] ABSTRACT

A method of coding a moving picture in which the moving picture is input and coded to produce coded data comprises a picture capturing step for capturing a picture at time $n.\Delta t$ (n: integer $\Delta t$: time interval) of an input moving picture as a still picture and outputting still picture data; a time information producing step for outputting time information corresponding to time $n.\Delta t$ when the moving picture is captured as the still picture in the picture capturing step; and a coding step for sequentially capturing and coding the still picture data output in the picture capturing step, computing a time interval between two continuous still pictures in capturing time of the captured still picture data using the time information output in the time information producing step, and when the computed time interval is $m.\Delta t$, (m: integer, $m \geq 2$), inserting coded data corresponding to (m−1) or less still pictures between coded data and coded data of the two still pictures so that the time interval between coded still pictures is set to be constant.

16 Claims, 14 Drawing Sheets

MOVING PICTURE CODING METHOD, MOVING PICTURE CODING APPARATUS AND MOVING PICTURE CODING PROGRAM RECORDING MEDIUM

FIELD OF THE INVENTION

The present invention relates to a moving picture coding method, a moving picture coding apparatus, and a moving picture coding program recording medium and, more particularly to a moving picture coding method, a moving picture coding apparatus, and a moving picture coding program recording medium, in which compressive coding is performed to captured moving pictures in real time.

BACKGROUND OF THE INVENTION

A technique in which analog video date or audio data is digitized to obtain digital video data or audio data has been widely available and remarkably developed, since it is easy to handle recording, edition, reproduction, or transmission of the digital data. An advantage of digitization is that data can be compressed with ease, so that compressive coding is very important to recording and transmission. For the compressive coding technique, international standards are established, among which MPEG (Moving Picture Experts Group) standard has been widely spread as a general digital standard in which video including moving pictures or audio may be handled.

Recently, with high-speed and low-cost computers and semiconductor devices such as VLSIs, personal computers referred to as multimedia personal computers are on the market at a lower price, thereby compression and expansion of digital audio and video is also implemented in a system using a cheap PC (Personal Computer).

As a prior art implementation in a system using a PC, a moving picture coding apparatus which performs compressive coding to captured moving pictures in real time and preserves resulting coded data is described hereinafter. The moving picture coding apparatus as the first prior art example has a construction shown in FIG. 13.

As shown in the Figure, the moving picture coding apparatus comprises a CPU (Central Processing Unit) 301, a main memory 302, a bus bridge unit 303, a picture capture unit 304, an HD (Hard Disk) 305, an HD adaptor 306, a system bus 321, and an I/O bus 322. The picture capture unit 304 comprises an A/D conversion unit 307, a picture compressive coding unit 308, and an I/O bus interface unit 309. These are implemented on a computer system which includes a computer such as PC and peripherals thereof.

The CPU is used for controlling a function of the whole system including an operation by executing or interpreting instructions, or controlling data transfer. The main memory 302 is used for temporarily storing instructions or data and used as a work area for operation and the like. Tho bus bridge unit 303 is used for bridging transmission of instructions or data by signal conversion between buses, i.e., different signal paths and controlling I/O operations of the main memory 302. The picture capture unit 304 is used for receiving a moving picture as analog picture signals according to a general NTSC as a standard of TV signals, digitizing and compressively coding to the same. The A/D conversion unit 307 included in the picture capture unit 304 is used for converting analog picture signals into digital picture data. The compressive coding unit 308 is used for receiving the digital picture data from the A/D conversion unit 307 at a given rate and compressively coding to the same. The I/O bus interface 309 is used for transferring the picture compression data from the picture compressive coding unit 308 to the main memory 302. The HD 305 is used for preserving coded moving picture data. The HD adaptor 306 is connected to the I/O bus and used for transferring data of the main memory 302 to the HD 305. The system bus 321 and the I/O bus 322 are signal paths through which instructions or data are transmitted.

A moving picture processing of the first prior art moving picture coding apparatus constructed above is described hereinafter.

Input pictures are input to the moving picture coding apparatus as analog signals and converted into digital picture data at a given rate by the A/D conversion unit 307. In the moving picture processing, the moving picture is handled as a series of still pictures per unit of time and one still picture is referred to as a frame picture. That is, one frame corresponds to one screen. In general, a transfer rate or a processing rate of the moving picture processing is represented by a frame rate indicating the number of frames (the number of frame pictures) to be transferred/processed per second. Assume that the given rate of the A/D conversion is 30 fps (frame/sec).

The picture compressive coding unit 308 receives the digital picture data from the A/D conversion unit 307 and compressively codes the digital picture data at the same frame rate as the picture output from the A/D conversion unit 307. According to the MPEG, i.e., a compressive coding standard, processing must be performed at a constant rate. Herein, A/D conversion and compressive coding are performed at a constant rate so as to obtain coded data conforming to the standard.

The I/O bus interface 309 transfers the picture compression data output from the picture compressive coding unit 308 to tho main memory 302. The IID adaptor 306 transfers the picture compression data to the HD 305, the compressively coded data being recorded therein.

In the moving picture coding apparatus according to the first example of the prior art, processing is performed as mentioned above. Since the picture capture unit 304 includes the picture compressive coding unit 308 which handles numerous picture compressive processings, a large-scale LSI or the like is necessary, causing a high-cost coding apparatus. In the moving picture coding apparatus, picture compressive coding is executed in a special hardware, and to implement the apparatus using a general purpose computer system, special hardware with the picture compressive coding capability must be added thereto, which causes cost-up.

To provide a cheaper moving picture coding apparatus, the picture coding unit 308 including the picture capture unit 304 in the first example performs processing in software processing under control of CPU or auxiliarily using a picture compressive coding LSI or the like with a relatively low capability, by using a cheaper capture card with no picture compressive coding which is widely on the market as a computer expansion equipment. A moving picture coding apparatus which executes this software processing is shown in FIG. 14 as a second example of a prior art apparatus.

As shown in the Figure, the moving picture coding apparatus as the second example of prior art comprises a CPU 401, a main memory 402, a bus bridge unit 403, a picture capture unit 404, an HD 405, and HD adaptor 406, a system bus 421, and an I/O bus 422. The picture capture unit 404 comprises an A/D conversion unit 407 and an I/O bus interface unit 408. As in the first example, they are implemented on the computer system including a computer such as PC and peripherals thereof. The relatively cheap picture capture card, i.e., the picture capture unit 404 has no picture coding unit (308 in FIG. 13) unlike in the first example.

The CPU 401 is used for compressively coding digital picture data by using the main memory 402 as a work area. The A/D conversion unit 407 is used for outputting digital picture data resulting from conversion to the I/O bus interface unit 408. The other functions are identical to those of the first example.

An operation of a moving picture processing in the second moving picture coding apparatus is described hereinafter.

As in the first example, input pictures are input to the moving picture coding apparatus as analog signals and converted into digital picture data at a constant rate by the A/D conversion unit 407, which outputs resulting digital picture data to the I/O bus interface unit 408, which transfers the digital picture data to the main memory 402 by DMA (direct memory access) transfer.

The DMA transfer is a transfer in which data is directly transferred between the peripheral and the main memory or between the peripherals with no use of the CPU, namely, with no necessity of control of the CPU.

The digital picture data on the main memory 402 is compressively coded under control of the CPU 401 and resulting coded data is placed on the main memory 402. The HD adaptor 406 transfers the coded data on the main memory 402 to the HD 405 and recorded therein as in the first example.

As described above, in the second prior art moving picture coding apparatus, compressive coding depending on the hardware processing of the picture capture unit 304 in the first example is performed in software under control of the CPU 401 using a computer system as the moving picture coding apparatus, thereby hardware is added thereto at a lower price.

Thus, in the second prior art moving picture coding apparatus, as in the first example, input moving picture data is processed to obtain coded data. In this coding apparatus, if processing time of the picture compressive coding dynamically changes, it's probable that digitized picture data cannot be processed at a constant rate.

This may happen when the software processing is executed under multi tasking OS (operating system), for example. In this case, in the picture coding, i.e., software processing, a task (work) is executed concurrently with another task. As a consequence, the task is inevitably affected by another task.

For example, in a case in which when the second coding apparatus captures input pictures from the picture capture unit every Δt and compressively codes the captured pictures in real time, while operating the multi task OS, assume that real time processing is performed if only the picture coding is being performed However, in this situation, if the user runs an application (for example, word processor) which is different from the moving picture coding, the CPU must control processing of the word processor. Therefore, since CPU time must be allocated to control of the word processor, it is necessary to interrupt picture compressive coding. If there is a long interruption, the picture compressive coding cannot be performed within the time interval Δt, that is, it is impossible to process the input picture at an interval Δt. Coded data conforming to a standard which requires compressively coding to moving pictures at a constant frame rate such as MPEG, i.e., coded data with a constant frame rate, is not obtained.

Thus, in the prior art moving picture coding apparatus, hardware processing requires a special hardware which causes a cost-up as in the first example and coding cannot be performed smoothly due to an influence of multitasking or interruption as in the second example in which software processing is implemented at a low cost in a general system.

SUMMARY OF THE INVENTION

Accordingly, it is an object of the present invention to provide a moving picture coding method in which picture coding is performed at a lower price by software processing in a general computer system and simultaneously coded data with a constant rate according to MPEG standard is obtained even if the software processing is not executed at a constant rate due to influence of multi task processing.

It is another object of the present invention to provide a moving picture coding apparatus which performs moving picture coding using the method.

It is still another object of the present invention to provide a program recording medium which records a moving picture coding program which can perform the moving picture coding by executing the same in a general computer.

It is a further object of the present invention to provide the moving picture coding method, the moving picture coding apparatus, and the moving picture coding program recording medium, in which the moving picture coding is performed so that smooth moving pictures are obtained in playback of coded data.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

According to a first aspect of the present invention, a method of coding a moving picture in which the moving picture is input and coded to produce coded data, comprises: a picture capturing step for capturing a picture at time n.Δt (n: integer Δt: time interval) of an input moving picture as a still picture and outputting still picture data; a time information producing step for outputting time information corresponding to time n.Δt when the moving picture is captured as the still picture in the picture capturing step; and a coding step for sequentially capturing and coding the still picture data output in the picture capturing step, computing a time interval between two continuous still pictures in capturing time of the captured still picture data using the time information output in the time information producing step, and when the computed time interval is m.Δt, (m: integer, m≧2), inserting coded data corresponding to (m−1) or less still pictures between coded data and coded data of the two still pictures so that the time interval between coded still pictures is set to be constant.

According to a second aspect of the present invention, the method of coding a moving picture of the first aspect includes the coding step wherein coded data of one of previously captured still picture and subsequently captured still picture of the two still pictures is inserted between the coded data and coded data of the two still pictures.

According to a third aspect of the present invention, the method of coding a moving picture of the first aspect includes the coding step wherein combinations of coded data of the two still pictures, corresponding Lo coded data of plural still pictures are inserted between coded data and coded data of the two still pictures.

According to a fourth aspect of the present invention, the method of coding a moving picture of the first aspect includes the coding step wherein coded data indicating the same picture as one of the two still pictures, which is produced by at least one of forward predictive coding, backward predictive coding, and bidirectionally predictive coding is inserted between the coded data and coded data of the two still pictures.

According to a fifth aspect of the present invention, a method of coding a moving picture in which the moving picture is input and coded to produce coded data comprises: a time notifying step for notifying time every time interval k.Δt (k: integer); a picture capturing step for capturing a picture at time n.Δt (n: integer Δt: time interval) of an input moving picture as a still picture and outputting still picture data; and a coding step for sequentially capturing and coding the still picture data output in the picture capturing step, and adding coded data of a still picture behind coded data of previously captured still picture when there is time notification in the time notifying step while still picture data is being captured.

According to a sixth aspect of the present invention, a moving picture coding apparatus in which the moving picture is input and coded to produce coded data comprises: a picture capturing means for capturing a picture at time n.Δt (n: integer Δt: time interval) of an input moving picture as a still picture and outputting still picture data; a time information producing means for outputting time information corresponding to time n.Δt when the moving picture is captured as the still picture by the picture capture means; and a coding means for sequentially capturing and coding the still picture data output from the picture capture means, computing a time interval between two continuous still pictures in capturing time of the captured still picture data using the time information output from the time information producing means, and when the computed time interval is m.Δt, (m: integer, m≧2), inserting coded data corresponding to (m−1) or less still pictures between coded data and coded data of the two still pictures so that the time interval between coded still pictures is set to be constant.

According to a seventh aspect of the present invention, in the moving picture coding apparatus of the sixth aspect, the coding means inserts coded data of one of a previously captured still picture and a subsequently captured still picture of the two still pictures between the coded data and coded data of the two still pictures.

According to an eighth aspect of the present invention, in the moving picture coding apparatus of the sixth aspect, the coding means inserts combinations of coded data of the two still pictures, corresponding to coded data of plural still pictures between the two still pictures.

According to a ninth aspect of the present invention, in the moving picture coding apparatus of the sixth aspect, the coding means inserts coded data indicating the same picture as one of the two still pictures, which is produced by at least one of forward predictive coding, backward predictive coding, and bidirectionally predictive coding between the coded data and coded data of the two still pictures.

According to a tenth aspect of the present invention, a moving picture coding apparatus which receives and codes a moving picture to produce coded data comprises: a time notifying means for notifying time every time interval k.Δt (k: integer), a picture capture means for capturing a picture at time n.Δt (n: integer Δt: time interval) of an input moving picture as a still picture and outputting still picture data; and a coding means for sequentially capturing and coding the still picture data output from the picture capture means, and adding coded data of a still picture behind coded data of previously captured still picture when there is time notification from the time notifying means while still picture data is being captured.

According to an eleventh aspect of the present invention, in a recording medium which records a moving picture coding program in which a moving picture is input and coded to produce coded data, the moving picture coding program comprises a picture capturing step for capturing a picture at time n.Δt (n: integer Δt: time interval) of an input moving picture as a still picture and outputting still picture data; a time information producing step for outputting time information corresponding to time n.Δt when the moving picture is captured as the still picture in the picture capturing step; and a coding step for sequentially capturing and coding the still picture data output in the picture capturing step, computing a time interval between two continuous still pictures in capturing time of the captured still picture data using the time information output in the time information producing step, and when the computed time interval is m.Δt, (m: integer, m≧2), inserting coded data corresponding to (m−1) or less still pictures between coded data and coded data of the two still pictures so that the time interval between coded still pictures is set to be constant.

According to a twelfth aspect of the present invention, the moving picture coding program recording medium of the eleventh aspect includes the coding step of the recorded moving picture coding program, wherein coded data of one of a previously captured still picture and a subsequently captured still picture of the two still pictures is inserted between the coded data and coded data of the two still pictures.

According to a thirteenth aspect of the present invention of the eleventh aspect includes the coding step, wherein combinations of coded data of the two still pictures, corresponding to coded data of plural still pictures are inserted between coded data and coded data of the two still pictures.

According to a fourteenth aspect of the present invention, the moving picture coding program recording medium of the eleventh aspect includes the coding step of the recorded moving picture coding program wherein coded data indicating the same picture as one of the two still pictures, which is produced by at least one of forward predictive coding, backward predictive coding, and bidirectionally predictive coding is inserted between the coded data and coded data of the two still pictures.

According to a fifteenth aspect of the present invention, a recording medium which records a moving picture coding program in which a moving picture is input and coded to produce coded data, said moving picture coding program comprises a time notifying step for notifying time every time interval k.Δt (k: integer), a picture capturing step for capturing a picture at time n.Δt (n: integer Δt: time interval) of an input moving picture as a still picture and outputting still picture data; and a coding step for sequentially capturing and coding the still picture data output in the picture capturing step, and adding coded data of a still picture behind coded data of previously captured still picture when there is time notification in the time notifying step while still picture data is being captured.

DETAILED DESCRIPTION OF THE DRAWINGS

Embodiment 1

A moving picture coding apparatus according to a first embodiment of the present invention inserts coded data of still pictures between data and data that have been coded so that coded data with a required frame rate is obtained.

Figure 1:
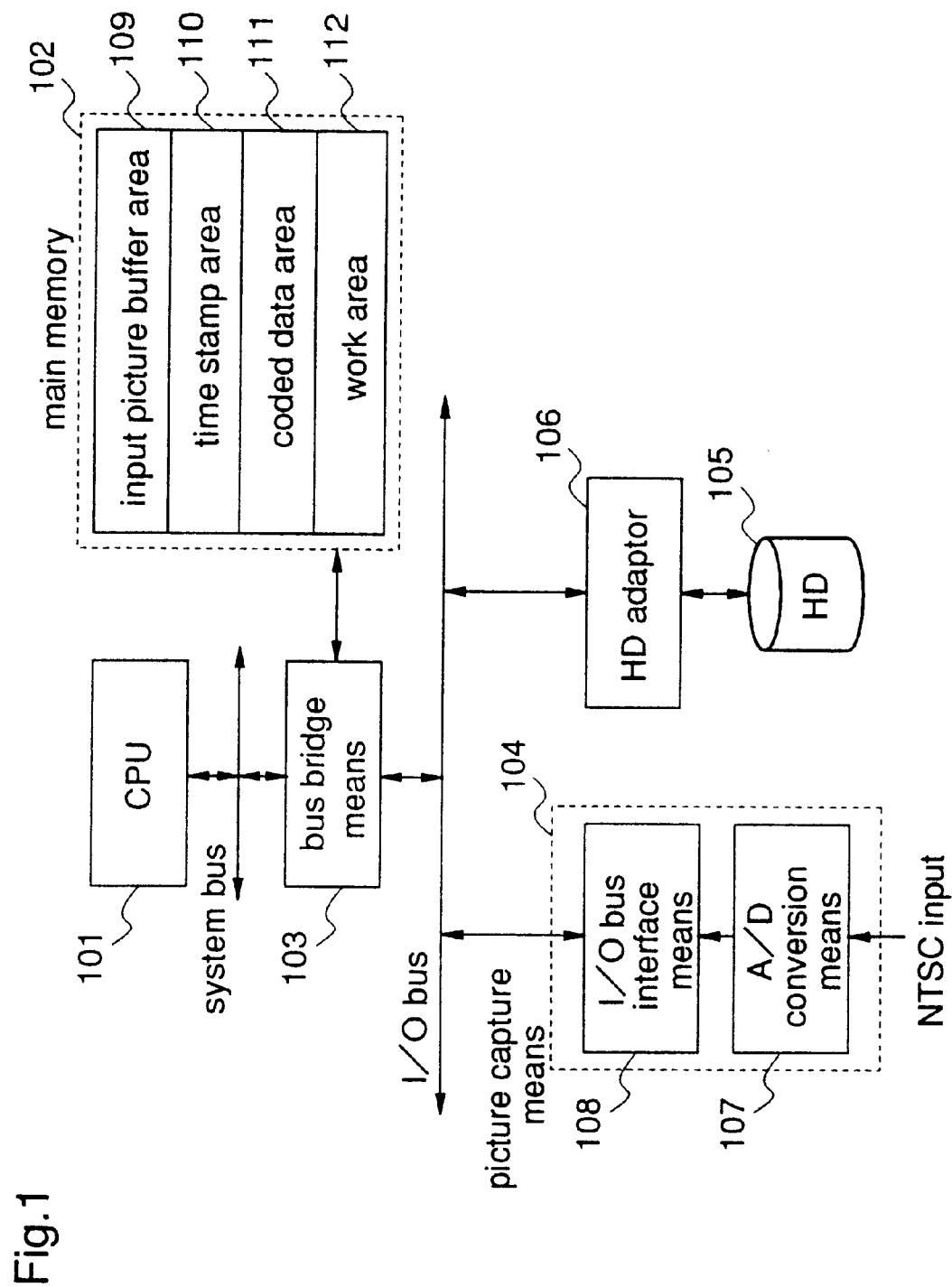
FIG. 1 is a block diagram showing a structure of a moving picture coding apparatus according to a first embodiment of the present invention.

FIG. 1 is a block diagram showing a construction of a moving picture coding apparatus according to a first embodiment of the present invention. As shown in the Figure, the moving picture coding apparatus comprises a CPU (Central Processing Unit) 101, a main memory 102, a bus bridge means 103, a picture capture means 104, an HD 105, an HD adaptor 106, a system bus 121, and an I/O bus 122. The picture capture means 104 comprises an A/D conversion unit 107, and an I/O bus interface means 108. These are implemented on a computer system which includes a computer such as PC and peripherals thereof.

The CPU 101 is used for controlling a function of the whole system including an operation by executing or interpreting instructions, or controlling data transfer. The main memory 102 is used for temporarily storing instructions or data and used as a working area for operation and the like. The bus bridge means 103 is used for bridging transmission of instructions or data between buses, namely, different signal paths, by signal conversion and controlling I/O operations of the main memory 102. The picture capture unit 104 is used for receiving a moving picture as analog picture signals according to a general NTSC as a standard of TV signals, digitizing the analog picture signals, and outputting digital picture data. The A/D conversion unit 107 included in the picture capture unit 104 is used for capturing the input moving picture as still pictures every specified discrete time, i.e., time interval Δt, digitizing the captured analog picture to obtain digital still picture data, and outputting the digital still picture data. The I/O bus interface 108 is used for transferring the digital picture data to an input buffer area 109 of the main memory 102 by DMA transfer and notifying the CPU 101 of interruption at the completion of transfer. The HD 105 is used for preserving coded moving picture data. The HD adaptor 106 is connected to the I/O bus and used for transferring data on the main memory 102 to the HD 105. The DMA function has already been described in the prior art. The system bus 121 and the I/O bus 122 are signal paths through which instructions or data are transmitted.

In this embodiment, the main memory 302 comprises the input picture buffer area 109 for storing the digital picture data which has been digitized and transferred by the picture capture means 104, a time stamp area 110 for storing a time in which the CPU 101 receives interruption notification from the picture capture means 104, a coded data area 111 for storing coded data resulting from the CPU 101's coding the digital picture data stored in the input picture buffer area 109, and a work area 112 for temporarily storing coded data resulting from the CPU's coding the digital picture data stored in the input picture buffer area 109.

Figure 2:
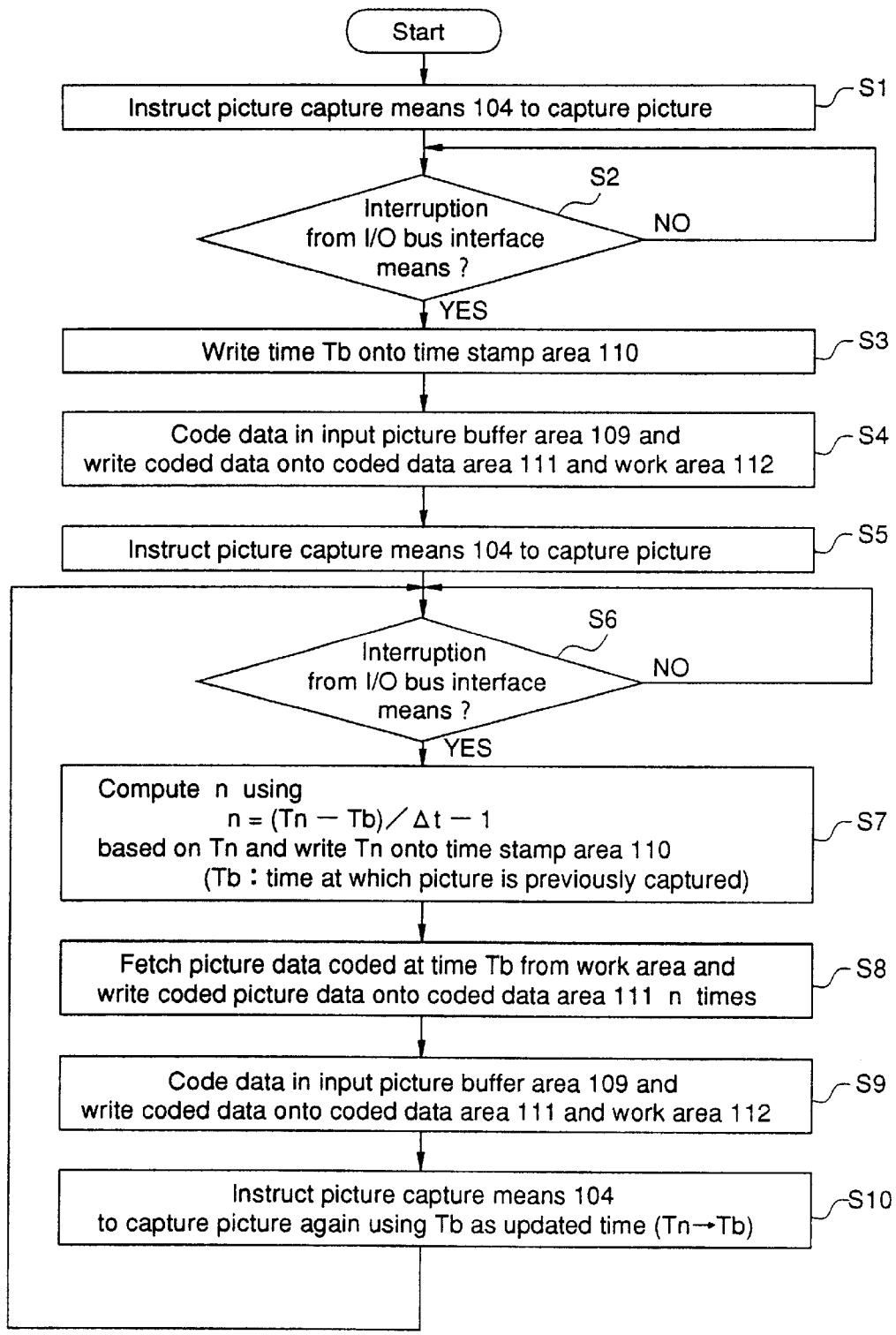
FIG. 2 is a flowchart showing a processing procedure of controlling moving picture coding or a CPU 101 of the first embodiment.
Figure 3:
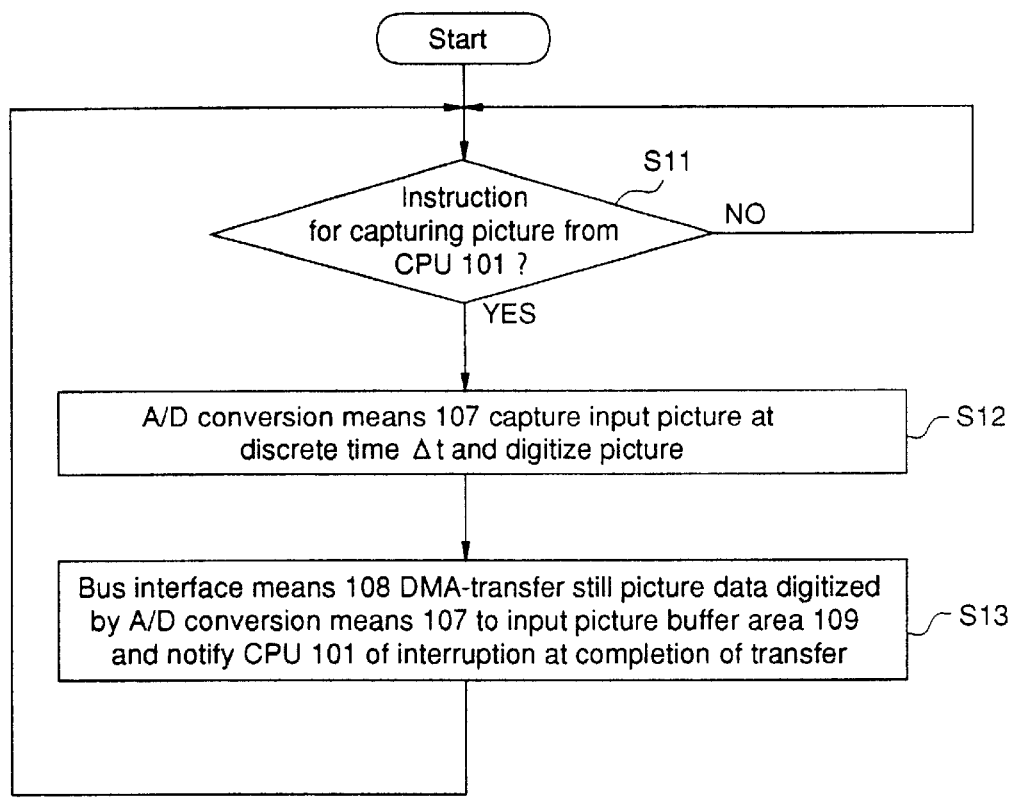
FIG. 3 is a flowchart showing a processing procedure of a picture capture means 104 of the first embodiment.
Figure 4:
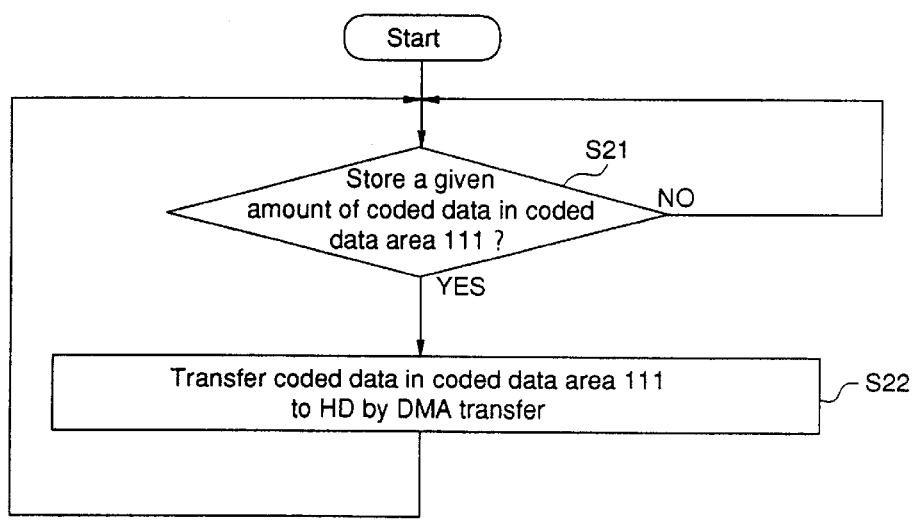
FIG. 4 is a flowchart showing a processing procedure of an HD adaptor 106 of the first embodiment.

FIG. 2 is a flowchart showing a processing procedure of controlling the moving picture coding in the CPU 101. FIG. 3 is a flowchart showing a processing procedure of the moving picture capture means 104. FIG. 4 is a flowchart showing a processing procedure of the HD adaptor 106.

Hereinafter, a coding operation of the moving picture coding apparatus according to the first embodiment constructed above is described. "A. WHOLE OPERATION, "B. OPERATION OF CPU 101", "C. OPERATION OF picture capture means 104", and "D. OPERATION OF HD ADAPTOR 106" are described with reference to FIG. 1, FIG. 2, FIG. 3, and FIG. 4, respectively.

A. WHOLE OPERATION

The picture capture means 104 starts processing of input pictures under control of the CPU 101. In the picture capture means 104, analog picture signals input as NTSC picture signals are subjected to analog/digital conversion in the A/D conversion means 107 and resulting digital picture data is sent through the I/O bus interface means 104, and stored in the input picture buffer area 109 of the main memory 102. The I/O bus interface means 108 outputs the interruption notification to the CPU 101 to inform that there has been a capturing operation in the picture capture means 104.

On receipt of the interruption notification, the CPU 101 fetches the digital picture data from the input buffer area 109 and performs compressive coding to each frame picture corresponding to a still picture to produce frame coded data, which is stored in the coded data area 111 of the main memory 102. At the same time, the CPU 101 writes the time at the receipt of the interruption notification onto the time stamp region 110, and stores the same frame coded data in the work area 112 of the main memory 102, to insert still pictures.

The picture capture means 104 starts capturing. The digital picture data is stored in the input picture buffer area. When the interruption notification is output to the CPU 101, the CPU 101 computes the number of inserted data, i.e., the number of inserted still pictures which are required to obtain coded data with a required frame rate, based on the time of the interruption notification and time of previous interruption notification recorded in the time stamp area 110. The CPU 101 writes previously processed frame coded data which is stored in the work area 112, i.e., frame coded data of the number of inserted data, onto the coded data area 111, and thereafter, writes another produced frame coded data onto the same, thereby coded data of the required number of still pictures is obtained.

When some data is stored in the coded data area 111, the HD adaptor 206 fetches coded data, to be stored in the HD 205. The coded data resulting from processing of the coding apparatus of the first embodiment is thus preserved in the HD 105.

While the moving pictures are being captured, updating storage contents of the time stamp area 110 and the work area 112, coded data with a required frame rate is obtained by repeating such processing.

B. OPERATION OF CPU 101

An operation of the CPU 101 is described with reference to FIG. 2. In step 1 of flow in FIG. 2, the CPU 101 instructs the picture capture means 104 to capture pictures. In accordance with the instruction, the picture capture means 104 operates. In step 2, it is decided whether there is interruption notification from the I/O bus interface means 108 or not. When it is decided that there is no interruption, step 2 is repeated, thereby the CPU 101 stands by until it receives interruption notification from the I/0 bus 108. The interruption notification is issued in step 13 of FIG. 3 in the operation of the picture capture means 104, which will be described in "C. OPERATION OF HD ADAPTOR".

In step 2, when it is decided that there is interruption notification from the I/O bus interface means 108, in step 3, the CPU 101 writes time Tb at the interruption notification onto the time stamp area 110. In step 4, the CPU 101 compressively codes the digital picture data stored in the input picture buffer area 109. Herein, one frame picture corresponding Lo one still picture is processed to produce frame coded data. The CPU 101 writes resulting frame coded data onto each of the coded data area 111 and the work area 112.

In step 5, the CPU 101 instructs the picture capture means 104 to capture pictures again. Step 6 is performed, thereby the CPU 101 stands by until it receives interruption notification from the I/O bus interface 108 as in the step 2.

In step 6, when it is decided that there is interruption notification, in step 7, the number of inserted data n is obtained by operation. The number of inserted data n is the number of still pictures to be inserted between the previously processed frame picture and currently processed frame picture, so as to set a frame rate of coded data to be required one, that is, to set a time interval between the frame pictures to be Δt. The CPU 101 computes n using the following formula (1) on the basis of the time Tn at the interruption notification and the time Tb written onto the time stamp area 110.

$$n=(Tn-Tb)/\Delta t-1 \qquad (1)$$

In step 7, the CPU 101 writes the time Tn onto the time stamp area 110. Assume that n=2.

After writing Tn, in step 8, the CPU 101 fetches the frame coded data, i.e., data in which pictures captured at Tb has been coded, from the work area 112. The frame coded data is written onto the coded data area 111 n times. Since n=2 herein, the frame coded data is written twice.

In step 9, the digital picture data of the frame picture stored in the input picture buffer area 109 is coded and resulting frame coded data is written onto each of the coded data area 111 and the work area 112, once, thereby coded data corresponding to n=2 still pictures is inserted between the frame coded data and the frame coded data on the basis of the input two still pictures.

By performing the steps 7 to 9, frame coded data which has been previously processed and stored in the work area 112 is updated. In step 10, using Tb as updated time (Tn→Tb), the picture capture means 104 is instructed to capture pictures again. Returning to step 6, steps 6 to 10 are repeated while pictures are being input, whereby coding is continued.

C. OPERATION OF PICTURE CAPTURE MEANS 104

An operation of the picture capture means 104 is described with reference to FIG. 3. In step 11, it is decided whether there is an instruction for capturing pictures from the CPU 101 or not. In step 11, it is decided that there is no instruction, step 11 is repeated, so that the picture capture means 104 stands by until it receives an instruction from the CPU 101.

In step 11, when it is decided that there is an instruction from the CPU 101, step 12 is performed. In step 12, the A/D conversion means 107 captures the input pictures as still pictures, digitizes the input pictures, and outputs resulting digital picture data to the I/O interface means 108.

In step 13, the bus interface means 108 transfers the digital picture data to the input buffer area 109 by DMA transfer. On completion of the transfer, the but interface 108 notifies the CPU 101 of the interruption. The CPU 101 receives the interruption notification in step 2 or step 6 in FIG. 2 and performs operation in step 3 or step 7 in the same Figure.

Meanwhile, the picture capture means 104 stands by until it receives an instruction from the CPU 101 again in step 11 in FIG. 3. Upon receipt of an instruction from the CPU 101, step 12 is performed. In this case, input analog picture signals at discrete time Δt are captured. Steps 11 to 13 are repeated while the pictures are being input as shown in FIG. 2.

D. OPERATION OF HD ADAPTOR 106

An operation of the HD adaptor 106 is described with reference to 4. In step 21, it is decided by the HD adaptor means 105 whether preset coded data is stored in the coded data area 111 or not. When it is decided that the preset coded data is not stored therein, step 21 is repeated, thereby the HD adaptor 105 stands by until a given amount of coded data is stored.

In step 21, when it is decided that a given amount of coded data has been stored, step 22 is performed. Tn step 22, the coded data stored in the coded data area 111 is transferred to the HD 105 by DMA transfer and recorded therein. Returning from step 22 to step 21, steps 21 and 22 are repeated, thereby coded data stored in the coded data area 111 is sequentially transferred to the HD 105 and recorded therein.

In FIGS. 2 to 4, completion of processing is not shown. For example, this is performed by hardware interruption such as mechanically detecting completion of picture input or inputting an instruction front the user. The CPU 101 interrupts flow in FIG. 2 and instructs the picture capture means 104 and the HD adaptor 105 to interrupt flows in FIG. 3 and FIG. 4, respectively, thereby entire processing of the moving picture coding apparatus is completed.

In this way, the moving picture coding apparatus can handle delay in processing of the CPU 101 due to interruption as described in the prior art. That is, when time interval between the picture data and the picture data captured by the picture capture means 104 is not smaller than Δt, the CPU 101 inserts coded data corresponding to n still pictures (the number of inserted data) between data and data with large time interval, based on the fact that the number of inserted data n is not smaller than 1 in the operation using the formula (1), thereby the frame rate of the coded data recorded in the HD 105 as an output of the moving picture coding apparatus is set to be constant. As the inserted data, coded data (frame coded data) of previously processed one still picture or subsequently processed one still picture, of the two still pictures which have been captured and coded, is used.

In accordance with the moving picture coding apparatus of the first embodiment, the picture capture means 104 captures a picture at Δt as a still picture upon receipt of an input moving picture an outputs the same. The CPU 101 outputs time information corresponding to the time Δt when the picture capture means 104 captures the still picture by time information production, computes time interval between two continuous still pictures in capturing time on the basis of time information resulting from the time information production, and inserts coded data of still pictures between coded data and data of the two still pictures so as to set the time interval to be Δt when the time interval is larger than Δt. Therefore, if smooth coding is not performed due to interruption and the like, coded data with a required frame rate is obtained.

Embodiment 2

A moving picture coding apparatus according to a second embodiment of the present invention obtains coded data with a required frame rate by inserting coded data as in the first embodiment and simultaneously produces data to be inserted by predictive coding to improve playback quality of picture.

A construction of tile moving picture coding apparatus of the second embodiment is identical to that of the first embodiment and is described with reference to FIG. 1. In the moving picture coding apparatus, the CPU 101 performs predictive coding. In general, compressive coding of moving picture data mainly includes compression on the basis of spatial correlation of still pictures constituting the moving picture, namely, intra-frame correlation and, by using compression on the basis of time correlation between close still pictures, namely, inter-frame correlation at the same time, a high compression ratio is realized. This compression on the basis of time correlation includes generating a predictive picture on the basis of a picture to be previously regenerated or a picture to be subsequently regenerated with respect to a still picture to be coded, obtaining difference between the predictive picture and the picture to be coded, and coding to the difference, thereby it is possible to improve the compression ratio as compared with processing the picture itself. It should be noted that CPU has more processing burden because the predictive picture is generated. Predictive coding on the basis of the picture to be regenerated previously is referred to as forward predictive coding and predictive coding on the basis of the picture to be regenerated subsequently is referred to as backward predictive coding. Predictive coding by the forward prediction or backward prediction is referred to as bidirectionally predictive coding.

Figure 5:
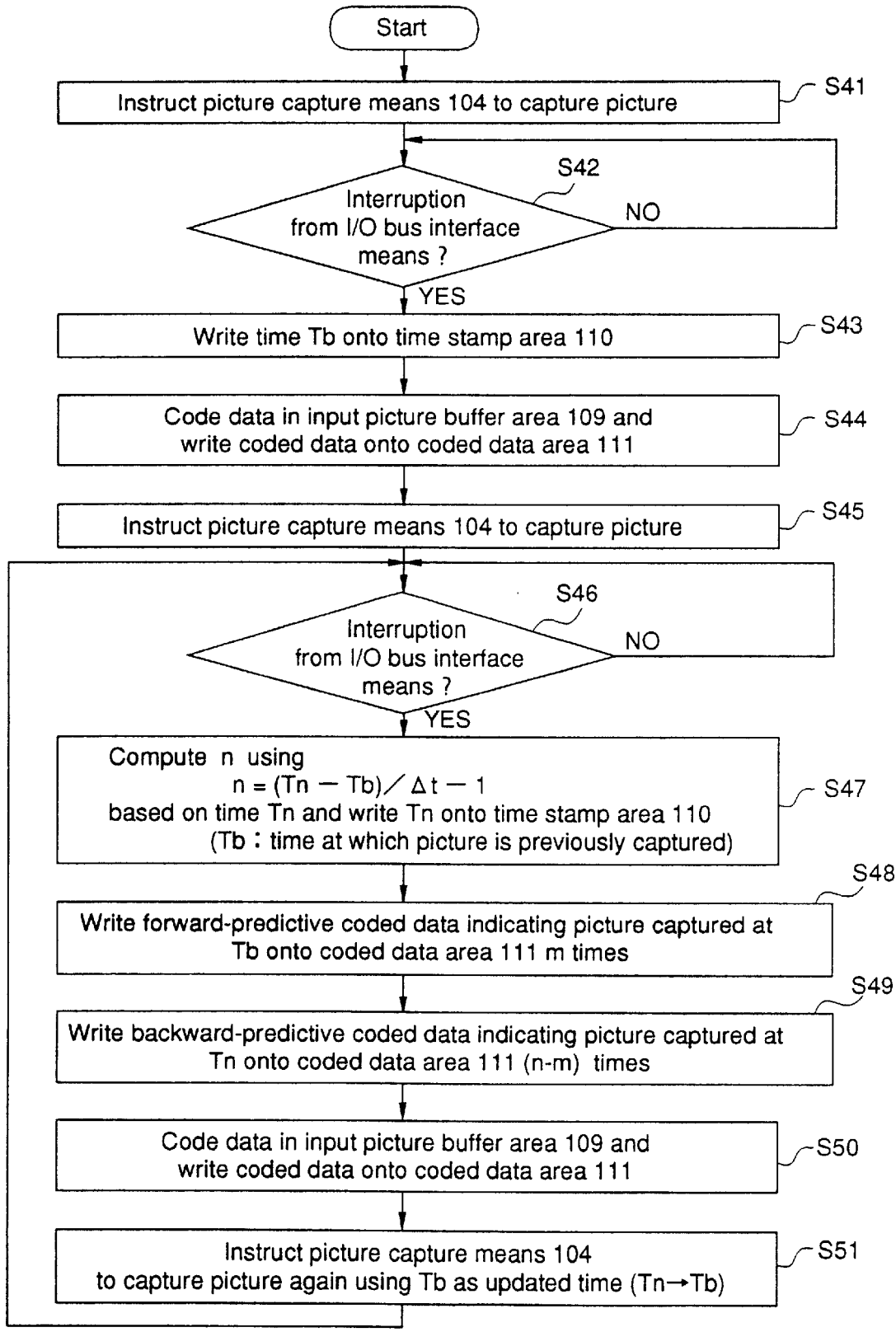
FIG. 5 is a flowchart showing a processing procedure of controlling moving picture coding of the CPU 101 of a second embodiment of the present invention.

The moving picture coding apparatus according to the second embodiment differs in control procedure of coding of the CPU 101 from that of the first embodiment. FIG. 5 is a flowchart showing a processing procedure of controlling moving picture coding of the CPU 101 of the second embodiment. Processing procedures of the picture capture means 104 and the HD adaptor 106 of the second embodiment are identical to those of the first embodiment and are described with reference to FIGS. 3 and 4.

An operation of coding to captured pictures of the moving picture coding apparatus according to the second embodiment is described with reference to FIG. 1 and FIGS. 3 to 5.

An operation of the CPU 101 is described with reference to FIG. 5. Steps 41 and 42 are performed as in the first embodiment shown in FIG. 2. The CPU 101 outputs an instruction to the picture capture means 104 and thereafter, stands by in step 42 until there is interruption from the picture capture means 104. An operation of the picture capture means 104 which has received the instruction in step 41 is shown in FIG. 3 and identical to that of the first embodiment "C. OPERATION OF PICTURE CAPTURE MEANS 104" and will not be discussed herein.

The picture capture means 104 starts capturing. After digital picture data is stored in the input picture buffer area 109 of the main memory 102, the I/O bus interface means 108 issues interruption notification to the CPU 101, in which step 43 in FIG. 5 is performed as in step 3 in FIG. 2 and time Tb at interruption notification is written onto the time stamp area 110.

In step 44, the CPU 101 compressively codes the digital picture data stored in the input picture buffer area 109, whereby a frame picture corresponding to one still picture is processed to produce frame coded data. The CPU writes resulting coded data onto the coded data area 111.

Steps 45 and 46 are performed as in steps 5 and 6 in FIG. 1 again. The CPU 101 outputs an instruction to the picture capture means 104 and thereafter, stands by in step 46 until there is an interruption from the picture capture means 104. The picture capture means 104 which received an instruction in step 45 operates as shown in FIG. 3. Upon receipt of interruption notification, the CPU 101 performs step 47 in FIG. 5.

In step 47, the CPU 101 obtains the number of inserted data n by operation as in the step 7 in FIG. 2. The CPU 101 computes n using the following formula (1) on the basis of the time Tn at the interruption notification and the time Tb written onto the time stamp area 110. The CPU 101 writes Tn onto the time stamp area 110.

In steps 48 and 49, inserted coded data is produced as frame coded data of the digital picture data corresponding to frame picture captured at Tb or the digital picture data corresponding to the frame picture captured at Tn.

A case In which n=2 is described as in the first embodiment. In steps 48 and 49, frame coded data corresponding to one still picture (frame picture) captured at time Tb, and frame coded data corresponding to one still picture (frame picture) captured at Tn are produced, respectively, wherein frame coded data of two still pictures (frame pictures) is produced for insertion.

In step 48, the CPU 101 writes frame coded data of one still picture corresponding to the picture captured at Tb which is produced by forward predictive coding onto the coded data area 111. In step 49, the CPU 101 writes coded data of one still picture corresponding to the picture captured at Tn, which is produced by backward predictive coding, onto the coded data area 111. As described above, (n=2) pieces of coded data is written onto the coded data area 111.

In step 50, the CPU 101 codes the digital picture data (time Tn) stored in the input picture buffer area 109 and writes resulting frame coded data onto the coded data area 111.

After coded data is written onto the coded data area 111, the HD adaptor 106 operates following the flow in FIG. 4 as in the first embodiment "D. OPERATION OF HD ADAPTOR 106" and will not be discussed herein.

As in the first embodiment 1, in FIG. 5, returning from step 51 to step 46, thereby using Tb as updated time (Tn→Tb) the operation mentioned above is repeated. Steps 46 to 51 are repeated to continue coding while the picture is being input. The operation is completed by interruption or the like as in the first embodiment.

For example, when the time interval between the still pictures, i.e., the interval between input pictures is $3 \cdot \Delta t$, coded data corresponding to two still pictures is inserted so as to set the time interval to be $\Delta t$. In the moving picture coding according to the second embodiment, first one of the two pictures in time, second one thereof in time, are assumed to be previous input picture data and subsequent input picture data, respectively. If coded data of two previous pictures are used as inserted data, frame interval of coded data remains to be $3 \cdot \Delta t$. By assuming the first and the second ones to be the previous input picture data and the subsequent input picture data, respectively, frame interval is made smaller ($2 \cdot \Delta t$) As a result, playback of moving pictures is performed with smooth variation in a screen.

Thus, in accordance with the moving picture coding apparatus according to the second embodiment, the picture capture means 104 captures a picture at time $\Delta t$ as a still picture when a moving picture is input and outputs the same. The CPU 101 outputs time information corresponding to time $\Delta t$ at which a still picture is captured by the picture capture means 104, computes time interval between two continuous still pictures in capturing time of captured still pictures on the basis of time information at the time information production, and inserts coded data of still pictures between the two still pictures so as to set the time interval to be $\Delta t$ when the time interval is larger than $\Delta t$. Therefore, if smooth coding is not performed due to interruption and the like, coded data with a required frame rate is obtained.

As the inserted data, coded data indicating the same picture as previously captured still picture or the subsequently captured still picture, which is produced by predictive coding, is used. As a result, it is possible to obtain coded data of high playback quality.

In the second embodiment, forward predictive coding and backward predictive coding have been described. Alternatively, it is possible to perform coding by using coded data of one of the previously captured still picture and subsequently captured still picture, which has been produced by at least one of forward predictive coding, backward predictive coding, and bidirectionally predictive coding.

Embodiment 3

A moving picture coding apparatus according to the third embodiment uses interruption notification from the timer every given period rather than recorded time stamp at the capturing picture, as time information for use in processing.

Figure 6:
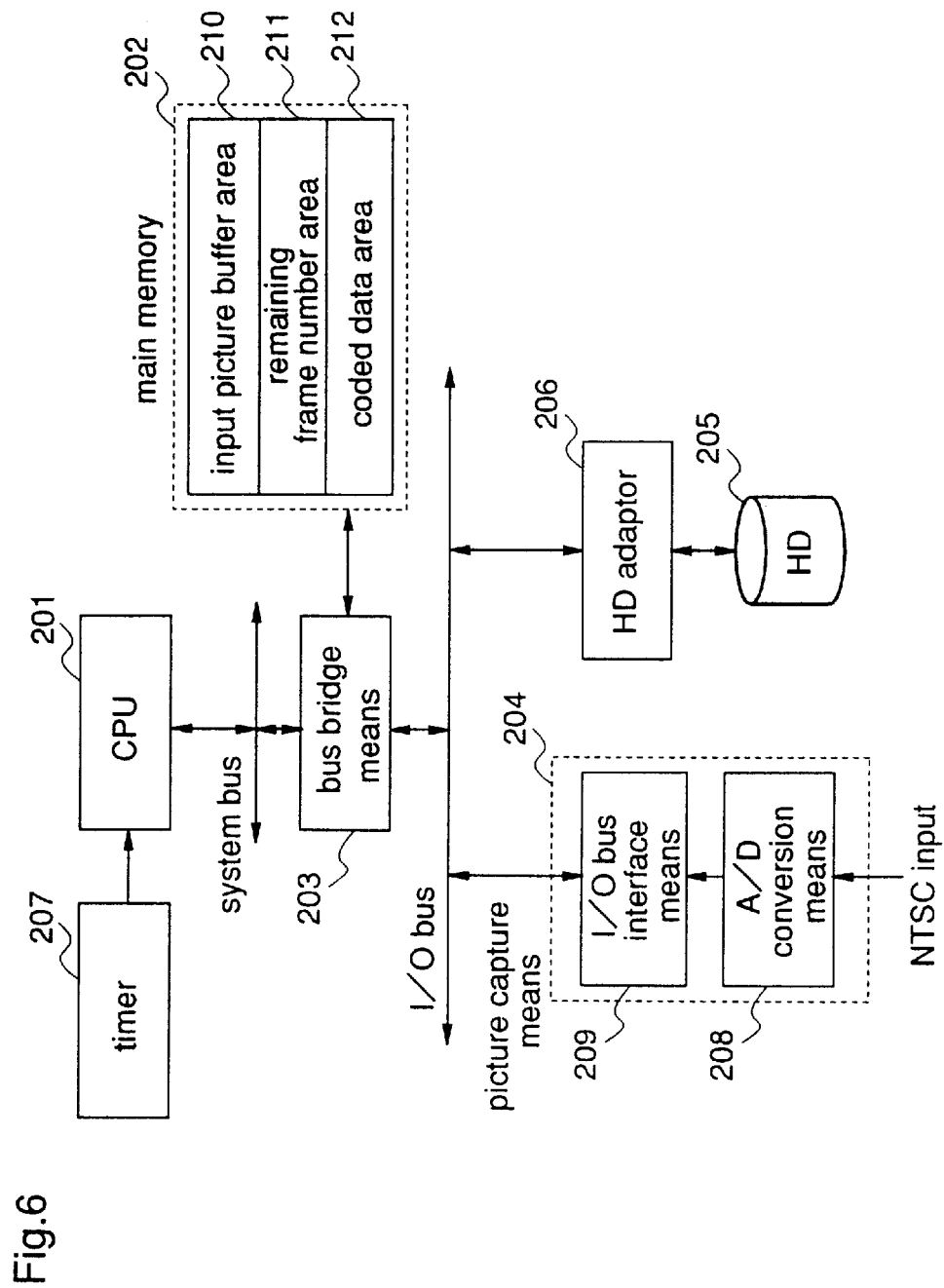
FIG. 6 is a block diagram showing a structure of a moving picture coding apparatus according to a third embodiment of the present invention.

FIG. 6 is a block diagram showing a construction of the moving picture coding apparatus according to the third embodiment of the present invention. As shown in the Figure, the moving picture coding apparatus comprises a CPU 201, a main memory 202, a bus bridge means 203, a picture capture means 204, an HD 205, an HD adaptor 206, a timer 207, a system bus 221, and an I/O bus 222, the picture capture means 204 including an A/D conversion means 208 and an I/O bus interface means 209. As in the first and second embodiments, these are implemented on a computer system comprising a computer such as PC and peripherals thereof. In the apparatus of third embodiment, the timer 207 is added to the apparatuses of the first or second embodiment In the Figure, the CPU 201 is used for coding using interruption notification from the timer 207 mentioned later. The main memory 202 comprises an input picture buffer area 210 for storing digital picture data which is digitized and transferred by the picture capture means 104, a remaining frame number area 211 for holding the number of still pictures to be coded to maintain a constant rate, and a coded data area 212 for storing coded data resulting from CPU's coding digital picture data stored in the input picture buffer area 210. The timer 207 is used for notifying the CPU 201 of interruption every $\Delta t$ when it receives the instruction from the CPU 201.

Figure 7:
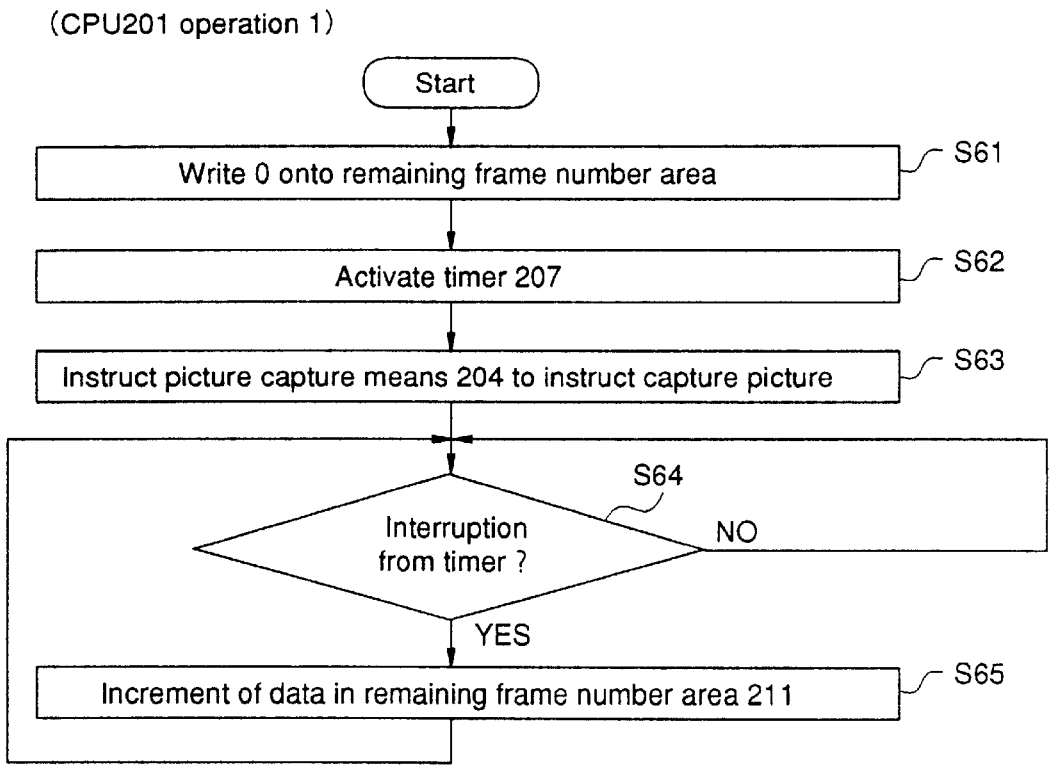
FIG. 7 is a flowchart showing a processing procedure of controlling the moving picture coding of a CPU 201 of the third embodiment.
Figure 7:
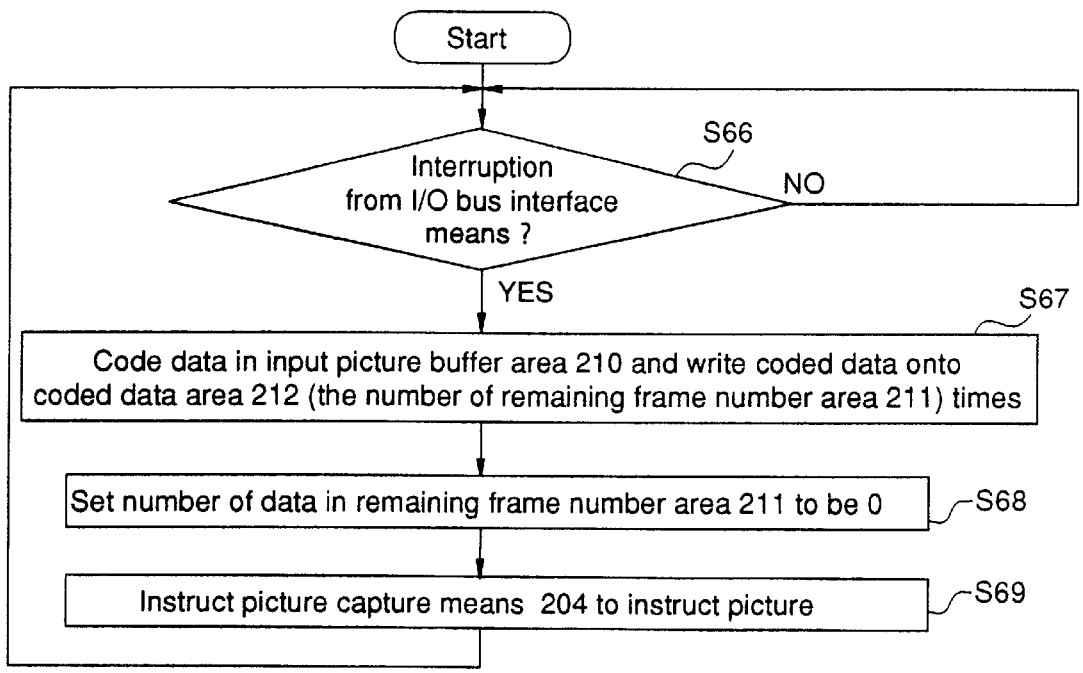
Figure 8:
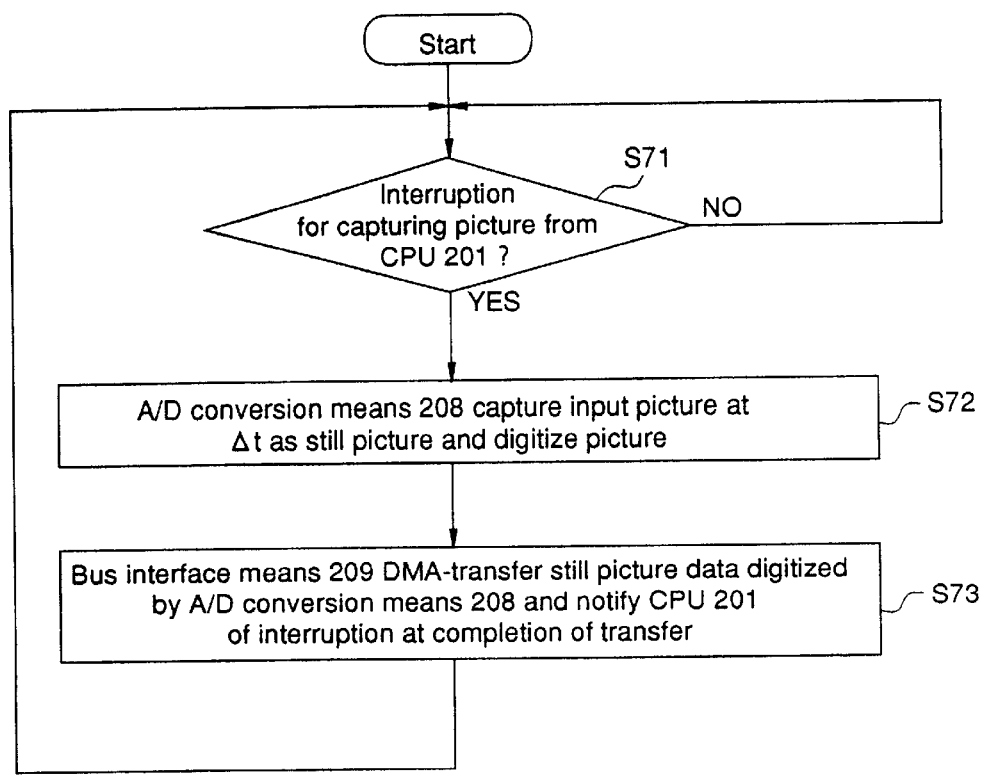
FIG. 8 is a flowchart showing a processing procedure of a picture capture means 204 of the third embodiment
Figure 9:
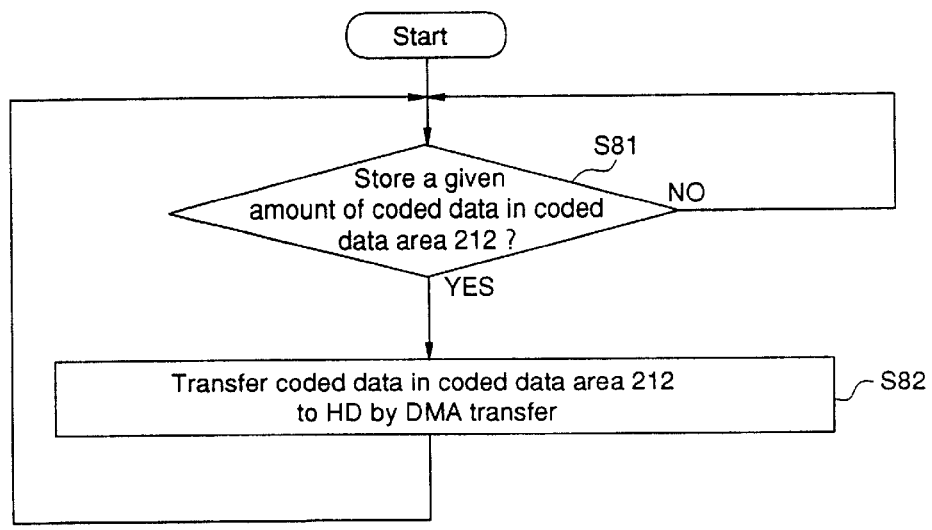
FIG. 9 is a flowchart showing a processing procedure of an HD adaptor 206 of the third embodiment.
Figure 10:
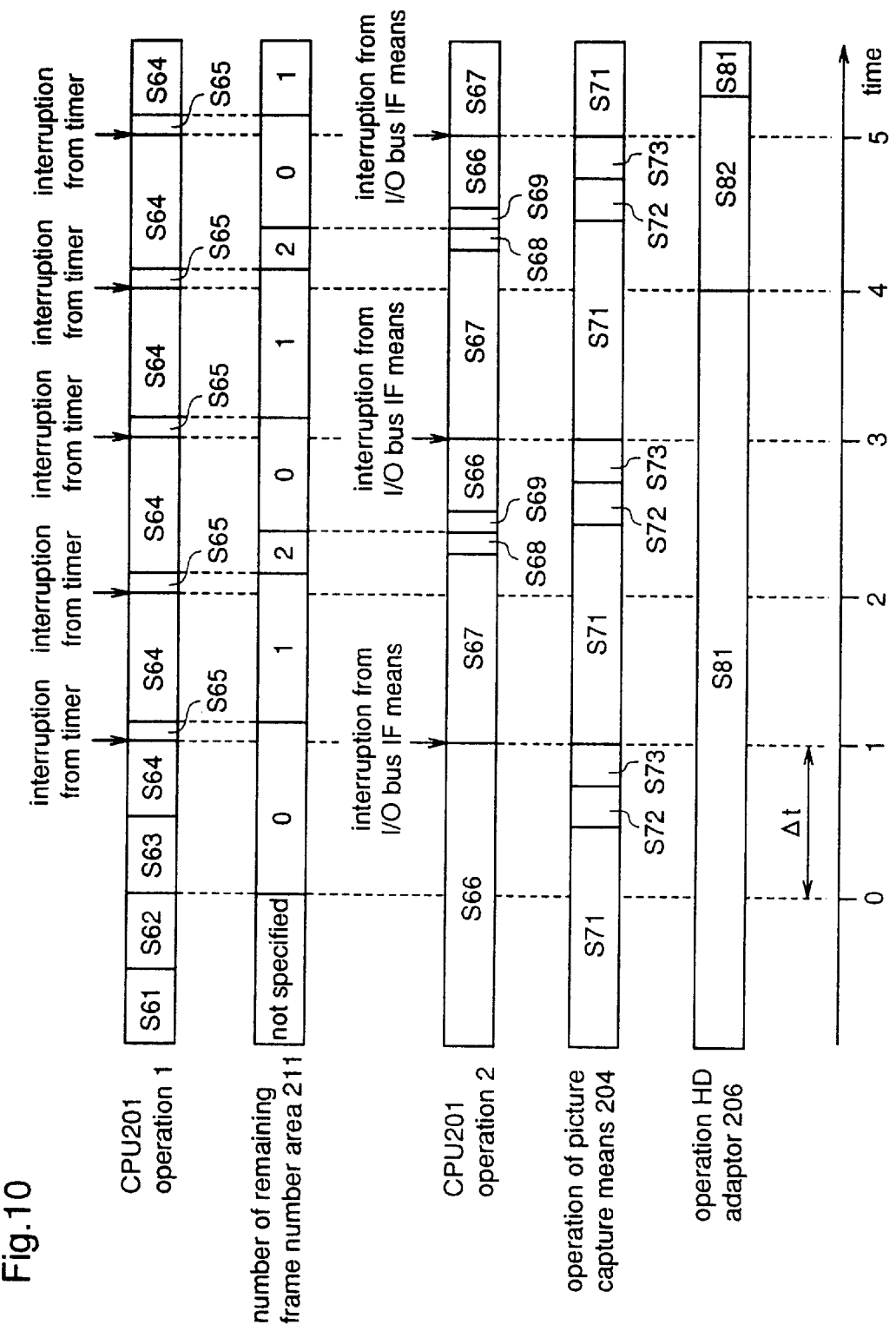
FIG. 10 is a diagram showing a relation between processing content and time in the CPU 201, the picture capture 204, and the HD adaptor 206.

The bus bridge means 203, the picture capture means 204, the HD 205, the HD adaptor 206, the system bus 221, and the I/O bus 222 are respectively identical to 103 to 106 and 221 and 222 of the first embodiment and will not be discussed herein FIG. 7 is a flowchart showing a processing procedure of controlling moving picture coding of the CPU 201. FIG. 8 is a flowchart showing a processing procedure of the moving picture capture means 204. FIG. 9 is a flowchart showing a processing procedure of the HD adaptor 206. FIG. 10 is a diagram showing respective relations between processing contents and time of the CPU 201, the picture capture means 204, and the HD adaptor 206.

Hereinafter, an operation of coding of the moving picture coding apparatus according to the third embodiment is described. "A. OPERATION OF CPU 201", "B. OPERATION OF PICTURE CAPTURE MEANS 204", and "C. OPERATION OF HD ADAPTOR 206" are described with reference to FIGS. 6 and 7, FIGS. 6 and 8, and FIGS. 6 and 9, respectively, and thereafter, "D. WHOLE OPERATION" is described with reference FIG. 10.

A. OPERATION OF CPU 201

An operation of the CPU 201 is described with reference to FIG. 7. The CPU 201 of the third embodiment performs two operations concurrently as separate processes. FIG. 7 is a flowchart showing two processing procedures (A-1 and A-2) of the CPU 201. Hereinafter, the A-1 and A-2 are respectively described.

A-1 OPERATION 1 OF CPU 201

A-1 illustrates operation of the CPU 201 (indicating CPU201-timer 207 realtion) as the CPU 201 operation 1.

In step 61, the CPU 201 writes an initial value "0" of the number of remaining frames onto the remaining frame number area 211 of the main memory 202. In step 62, the CPU 201 activates the timer 207 and subsequently in step 63 instructs the picture capture means 204 to capture pictures. In accordance with the instruction, the picture capture means 204 operates. In step 64, it is decided whether there is interruption notification from the timer 207 or not. When It is decided that there is no interruption, step 64 is repeated and the CPU 201 stands by until it receives interruption notification from the timer 207.

In step 64, when it is decided that there is interruption notification from the timer 207, in step 65, the CPU 201 performs increment processing to the number of remaining frames to increase tho number by "1". Returning to step 64, the CPU 201 stands by for interruption notification again and then steps 64 and 65 are repeated.

A-2 OPERATION 2 OF CPU 201

A-2 illustrates an operation of the CPU 201 (indicating CPU201-picture capture means 204 relation) as an operation 2 of the CPU 201. Step 66 is carried out as in step 2 or step 6 in FIG. 2. The CPU 201 stands by when it receives interruption notification from the I/O bus interface means 209 of the picture capture means 104.

In step 66, when it is decided that there is interruption notification from the I/O bus interface means 209, in step 67, the CPU 201 compressively codes the digital picture data stored in the input picture buffer area 210. A frame picture corresponding to one still picture is processed to produce frame coded data.

The CPU 201 obtains the number of remaining frames from the remaining frame number area 211, reproduces the frame coded data of the number of remaining frames, and writes reproduced frame coded data onto the coded data area 212. When the number of the remaining frame number area 211 is "2", the frame coded data is written onto the coded data area 212 twice continuously.

In step 68, the CPU 201 initializes the number of remaining frames and obtains "0". In step 69, the CPU 201 instructs the picture capture means 204 to capture pictures and thereafter, returning to step 66 and stands by for interruption. Thereafter, steps 66 to 69 are repeated.

B. OPERATION OF PICTURE CAPTURE MEANS 204

An operation of the picture capture means 204 is described with reference to FIG. 8. As in step 11 in FIG. 3, in step 71, it is decided whether the CPU 201 instructs the picture capture means 204 to capture pictures or not and the picture capture means 204 stands by until it receives an instruction from the CPU 201.

As described above, in step 63 or 69 in FIG. 7, when the CPU 201 outputs an instruction for capturing operation, step 72 subsequent to step 71 in FIG. 8 is performed. Steps 72 and 73 are performed as in the steps 12 and 13 in FIG. 3. Note that time at which a still picture is captured by the A/D conversion means 208 is assumed to be synchronized with the time at which the timer 207 notifies the CPU 201 of interruption.

C. OPERATION OF HD ADAPTOR 206

An operation of the HD adaptor 206 shown in FIG. 9 is performed as in steps 81 and 82 in the same Figure and steps 21 and 22 in FIG. 4. As in the case of the first embodiment, coded data stored in the coded data area 212 is sequentially transferred to the HD 205 and recorded therein.

D. WHOLE OPERATION

With reference to FIG. 10, respective relations between processing contents and time of the CPU 201, the picture capture means 204, and the HD adaptor 206 are described. Each operation flow is shown from left to right in the Figure at time interval Δt. Processings in steps 65, 68 and 69 are assumed to complete in an extremely short time for explanation.

The CPU 201 writes a value "0" as an initial value of the number of remaining frames onto the remaining frame number area 211 and then activates the timer 207 (steps 61 and 62), thereby increment of the number of remaining frames is started under control of the CPU 201. Thereafter, the timer 207 notifies the CPU 201 of interruption every Δt. The CPU 201 performs operation shown in A-2 (CPU operation 2) concurrently with the operation shown in A-1, during which (the steps 61 and 62), the CPU 201 stands by until it receives an interruption from the I/O bus interface 209 (step 66).

The CPU 201 instructs the picture capture means 204 to capture pictures and then stands by for interruption notification from the timer 207 (steps 63 and 64). Meanwhile, the picture capture means 204 stands by until it receives an instruction from the CPU 201 (step 71). Upon receipt of an instruction for capturing pictures from tho CPU 201 corresponding to operation in step 63, the picture capture means 204 captures pictures and notifies the CPU 201 of interruption, and then stands by for an instruction for capturing pictures from the CPU 201 (steps 72 and 73).

During the A-1 operation of the CPU 201 (CPU 201 OPERATION 1), every time the CPU 201 receives interruption notification from the timer 207, it repeats increment of the number of remaining frames and standby (steps 64 and 65).

A-2 operation of the CPU 201 (OPERATION 2 OF CPU 201) corresponds to the operation in step 73 of the picture capture means 204. Upon receipt of an interruption from the I/O bus interface means 209, the CPU 201 performs coding to the digital picture data stored in the input picture buffer area 210, writes coded data onto the coded data area 212, and returns the number of remaining frames to "0" for initialization. (steps 67 to 69).

Concurrently with the series of operations, the HD adaptor 206 stands by until a given amount of coded data is stored in the coded data area 212 and sequentially transfers coded data to the HD 205 by DMA transfer (steps 81 and 82).

That is, the timer 207 notifies the CPU 210 of time every time interval Δt and the picture capture means 204 captures a picture at Δt of an input moving picture as a still picture and outputs the digital picture data. As coding of inserting coded data, the CPU 201 sequentially captures and codes the still picture output from the picture capture means 204, and when the timer 207 notifies the CPU of time while still pictures are being captured, it inserts coded data of a still picture behind coded data of previously captured still picture. In this case, the CPU 201 inserts coded data of the previously captured still picture.

Thus, in accordance with the moving picture coding apparatus of the third embodiment, the timer 207 outputs interruption notification to the CPU 201 every given time interval and the remaining frame number area 211 of the main memory 202 stores the number of remaining frames resulting from increment processing to the initial value "0". Therefore, if the CPU 201 cannot capture input pictures at a constant frame rate, thereby time interval between still pictures input from the picture capture means 204 is not smaller than Δt, by using the interruption notification output from the timer 207 every given time interval, computes the time interval between two continuous still pictures in capturing time of captured pictures without adding rime code to the captured picture, arid inserts coded data of the two still pictures, i.e., coded data of the. number for setting the time interval obtained using the number of remaining frames to be always Δt, between coded data and coded data of the two still pictures. As a result, it is possible to obtain coded data with a required constant frame rate.

Though in the moving picture coding apparatus of the third embodiment, the timer 207 must be added to the coding apparatuses of the first and second embodiments, writing time at which the data is captured onto the main memory 202 is unnecessary. Therefore, it is possible to reduce processing burden of the CPU 201. Further, only the remaining frame number area 211 of relatively small area is included as compared with tile first embodiment wherein the time stamp area 110 and the work area 112 are included in the main memory 102. As a result, it is possible to reduce an area occupied in the main memory 202 for coding and exploit a device resource.

Embodiment 4

The moving picture coding apparatus according to the fourth embodiment of the present invention performs control using time notification from the timer as in the third embodiment and produces inserted data by predictive coding.

Figure 11:
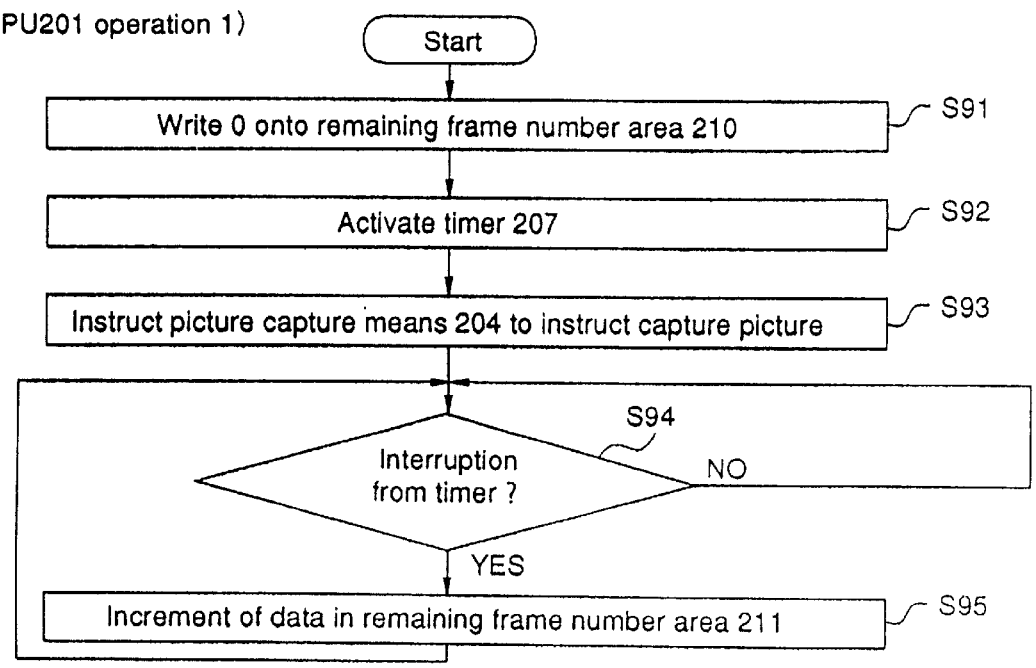
FIG. 11 is a flowchart showing a processing procedure of controlling a moving picture coding of the CPU 201 of a fourth embodiment of the present invention.
Figure 11:
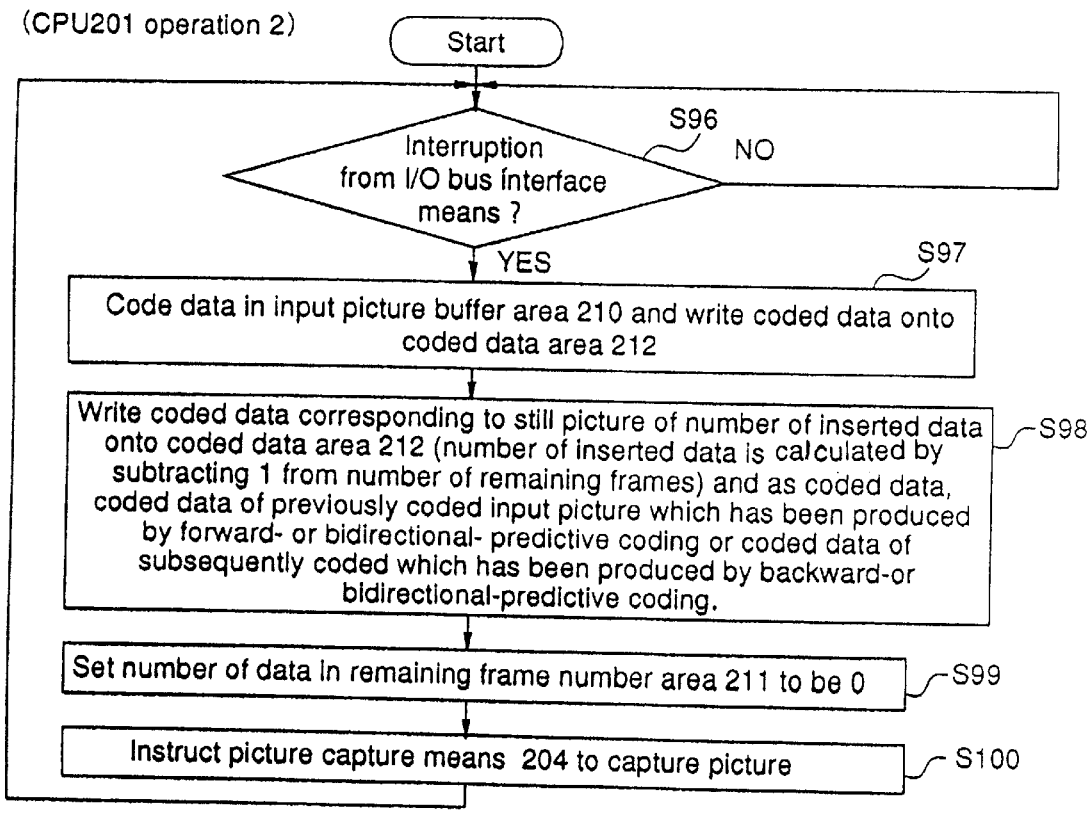
Figure 12:
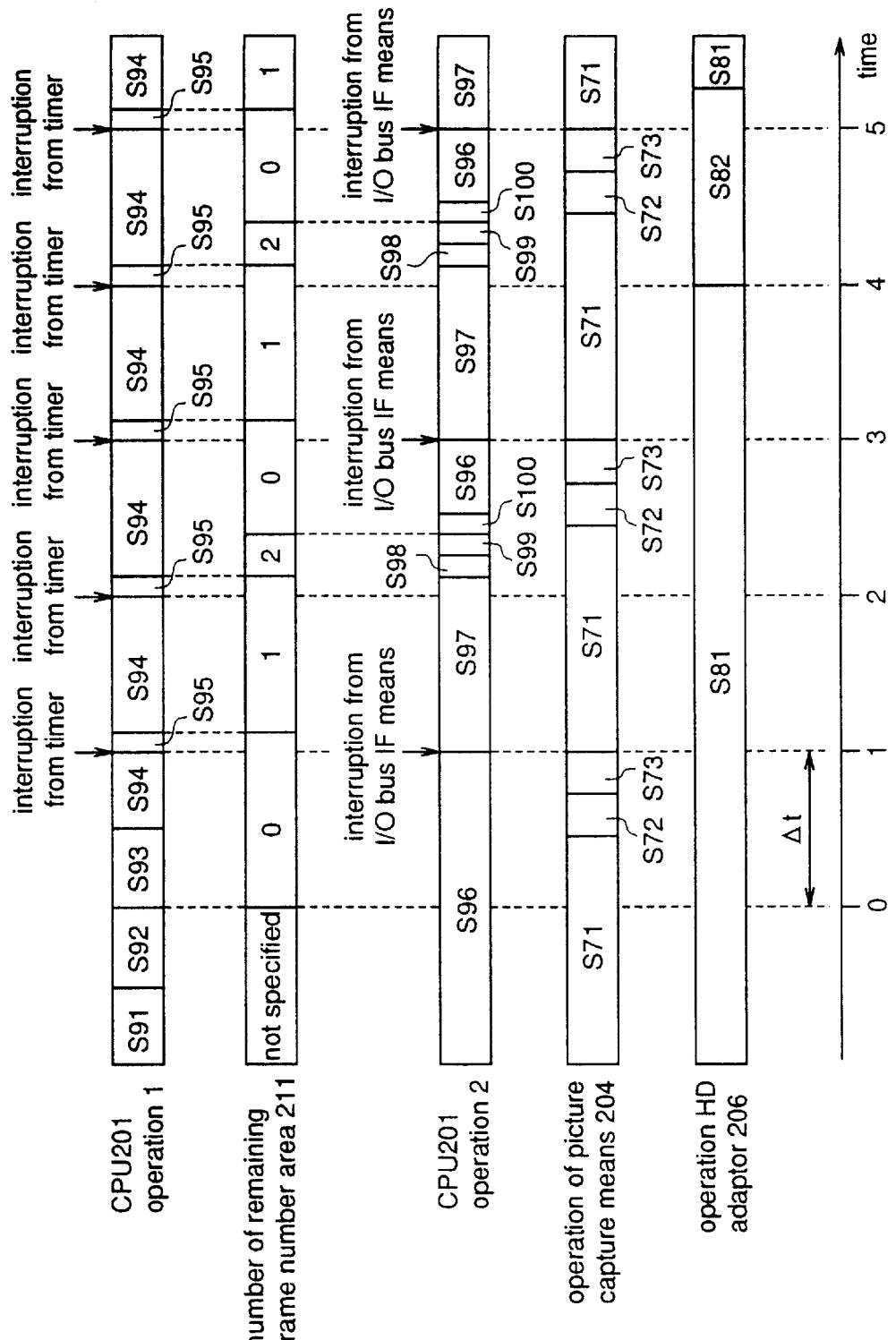
FIG. 12 is a diagram showing a relation between processing content and time in the CPU 201, the picture capture means 204, and the HD adaptor 206.
Figure 13:
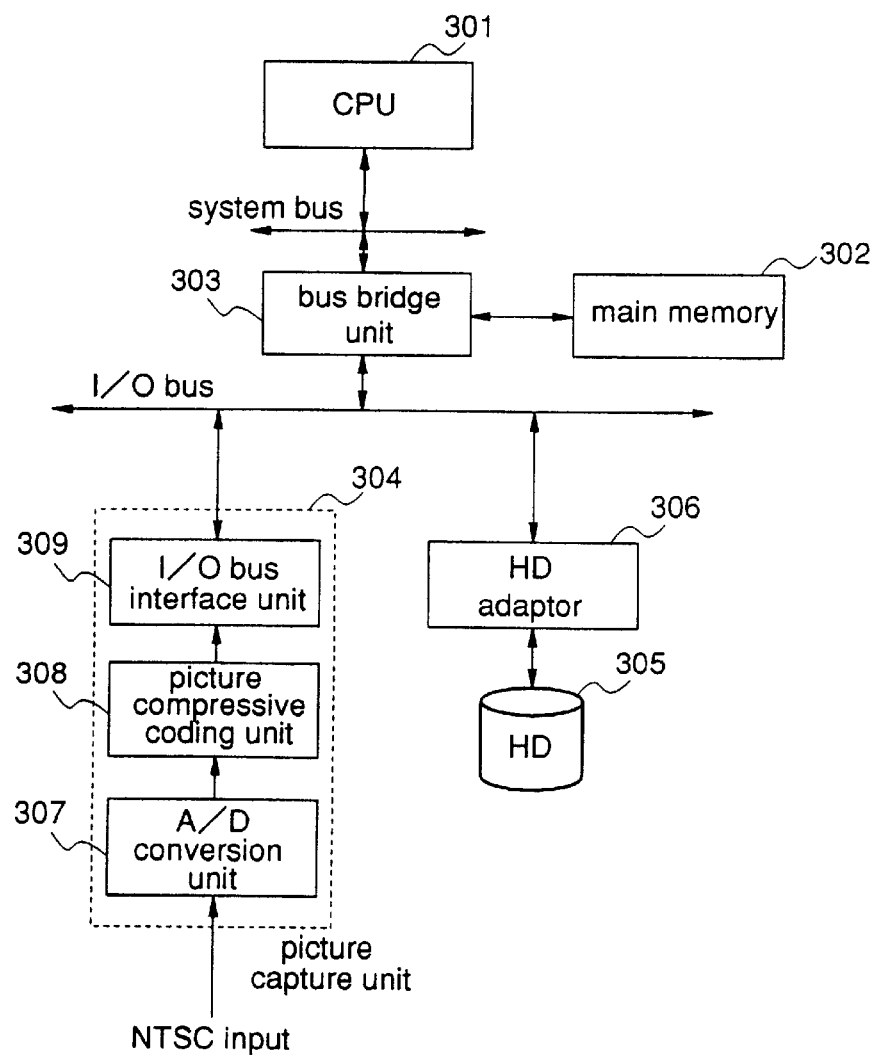
FIG. 13 is a block diagram showing a structure of a prior art moving picture coding apparatus.
Figure 14:
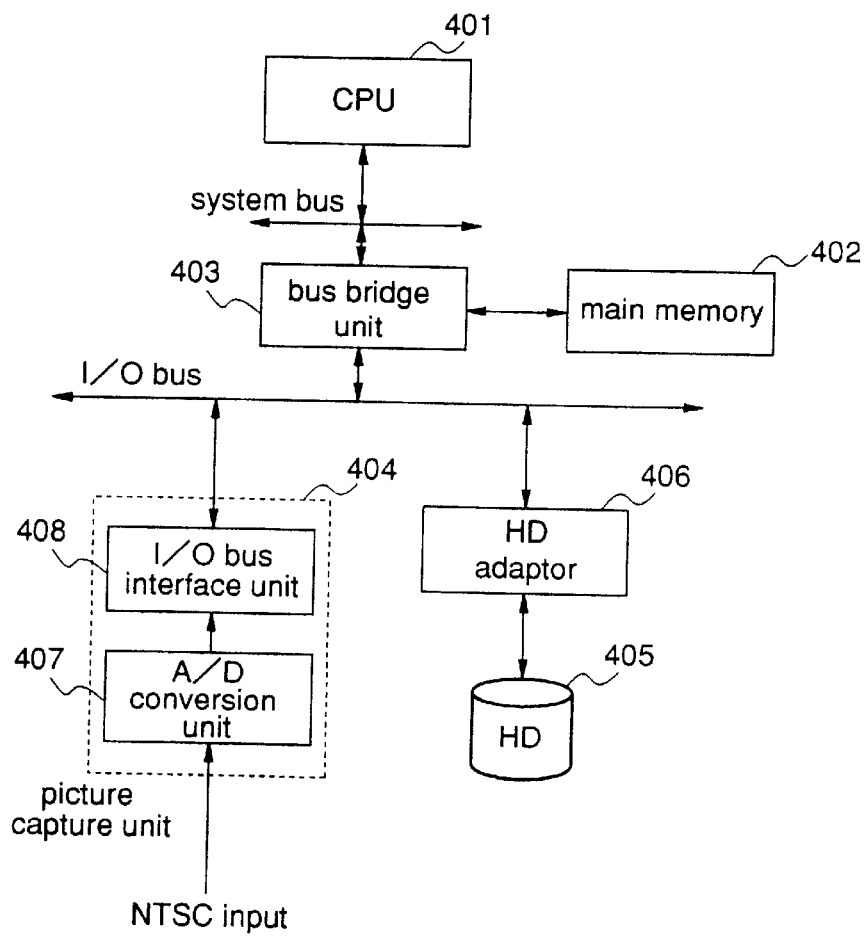
FIG. 14 is a block diagram showing a structure of a moving picture coding apparatus of another prior art moving picture coding apparatus.

The construction of the moving picture coding apparatus of the fourth embodiment is identical to that of the third embodiment and described with reference to FIG. 6. The moving picture coding apparatus of the fourth embodiment differs in control procedure of coding of the CPU 201 from that of the third embodiment. FIG. 11 is a flowchart showing a processing procedure of controlling the moving picture of the CPU 201 of the fourth embodiment. FIG. 12 is a diagram showing respective relations between processing contents and time of, the CPU 201, the picture capture means 204, and the HD adaptor 206.

Operations of the picture capture means 204 and the HD adaptor 206 of the moving picture coding apparatus according to the fourth embodiment are respectively identical to those of the third embodiment in FIGS. 8 and 9 and are not described herein.

Hereinafter, a coding operation of the moving picture coding apparatus of the fourth embodiment constructed above is described. "A. OPERATION OF CPU 201" and "B. WHOLE OPERATION" are described with references FIG. 11 and 12, respectively.

A. OPERATION PF CPU 201

An operation of the CPU 201 is described with reference to FIG. 11. The CPU 201 of the fourth embodiment performs two operations concurrently as separate processes as in the third embodiment. FIG. 11 is a flowchart showing two processing procedures (A-1 and A-2) of the CPU 201. Hereinafter, the A-1 and A-2 are respectively described

A-1 OPERATION 1 OF CPU 201

A-1 illustrates an operation of the CPU 201 (indicating CPU201-timer 207 relation). In this embodiment, as in the third embodiment, in step 91, step 92, step 93, step 94, and step 95, writing an initial value, activation of the timer 207, Instruction to the picture capture means 204, stand by for interruption notification, and increment processing are performed, respectively.

A-2 OPERATION 2 OF CPU 201

A-2 illustrates an operation of the CPU 201 (indicating CPU201-picture capture means 204 relation). Step 96 is performed as in step 66 in FIG. 7. The CPU 201 stands by until it receives interruption notification from the I/O bus interface means 209.

In step 96, when it is decided that there is interruption notification from the I/O bus interface 209, step 97 is performed as in the step 67 of the third embodiment. The CPU 201 performs compressive coding to the digital picture data stored in the input picture buffer area 210. Herein, one frame picture corresponding to one still picture is processed to produce frame coded data.

In step 98, the CPU 201 writes coded data corresponding to still pictures of the number of he inserted data onto coded data area 212, the number of inserted data being calculated by subtracting 1 from the number of remaining frames. In this case, as the coded data, coded data indicating the same picture as previously coded input picture, which has been produced by forward or bidirectionally predictive coding, or coded data indicating the same picture as subsequently coded picture, which has been produced by backward or bidirectionally predictive coding.

For example, when the number of the remaining frame number area 211 is 3, 2 pieces of coded data is written onto the coded data area 212 as inserted data, the number of which is 3−1=2. As initial coded data, coded data indicating the same picture as previously coded still picture, resulting from forward predictive coding, Is used. As the second coded data, coded data indicating the same picture as subsequently coded still picture, resulting from backward predictive coding, is used.

In step 98, the CPU 201 initializes the number of remaining frames, that is, sets the number to be 0. In step 99, the CPU 201 instructs the picture capture means 204 to capture pictures. Then, returning to step 96, the CPU stands by for interruption. Thereafter, steps 96 to 99 are repeated.

B. WHOLE OPERATION

Referring to FIG. 12, respective relations between processing contents and times of the CPU, the picture capture means 204, and the HD adaptor 206 are described. As in the third embodiment, each operation flow is shown from left to right in the Figure at time interval Δt. Processing in steps 95, 98, 99 99, and 100 are assumed to complete in an extremely short time for explanation.

The CPU 201 writes a value "0" as an initial value of the number of remaining frames onto the remaining frame number area 211 and then activates the timer 207 (steps 91 and 92), thereby increment of the number of remaining frames is started under control of the CPU 201. Thereafter, the timer 207 notifies the CPU 201 of interruption every time interval Δt.

The CPU 201 performs operation shown in A-2 (CPU operation 2) concurrently with the operation shown in A-1, during which (the steps 91 and 92), the CPU 201 stands by until it receives an interruption from the I/O bus interface 209 (step 96).

Thereafter, the CPU 201 instructs the picture capture means 204 to capture pictures in A-1 operation and then stands by for interruption notification from the timer 207 (steps 93 and 94). Meanwhile, the picture capture means 204 stands by until it receives an instruction from the CPU 201 (step 71). Upon receipt of an instruction for capturing pictures from the CPU 201, which corresponds to an operation in step 63, the picture capture means 204 captures pictures and, after interruption notification to the CPU 201, it stands by for an instruction for capturing pictures from the CPU 201 (steps 72 and 73).

Thereafter, during the A-1 operation of the CPU 201 (CPU 201 OPERATION 1), every time the CPU 201 receives interruption notification from the timer 207, it repeats increment of the number of remaining frames and standby. (steps 94 and 95)

A-2 operation of the CPU 201 (OPERATION 2 OF CPU 201) corresponds to the operation in step 73 of the picture capture means 204. Upon receipt of interruption from the I/O bus interface means 209, the CPU 201 performs coding to the digital picture data stored in the input picture buffer area 210, writes coded data onto the area 212, and returns the number of remaining frames to "0" for initialization. (steps 97 to 99).

Concurrently with the series of operations, the HD adaptor 206 stands by until a given amount of coded data is stored in the coded data area 212 and sequentially transfers coded data to the HD 205 by DMA transfer (steps 81 and 82).

For example, when the interval between the still pictures, i.e., the interval between input pictures is 3.Δt, coded data of two still pictures is inserted so as to set the time interval to be Δt. In the moving picture coding according to the fourth embodiment, first one of the two pictures in time, second one thereof in time, are assumed to be previous input picture data and subsequent input picture data, respectively. Assuming that coded data of two previous pictures is used as inserted data, frame interval of reproduced coded data remains to be 3.Δt. By using the first and the second ones as the previous input picture data and the subsequent input picture data, respectively, frame interval is made smaller (2.Δt), thereby playback of moving pictures is performed with smooth variation in a screen.

Thus, in accordance with the moving picture coding apparatus of the fourth embodiment, the timer 207 outputs interruption notification to the CPU 201 every given time interval and the remaining frame number area 211 of the main memory 202 stores the number of remaining frames resulting from increment processing to the initial value "0". Therefore, if the CPU 201 cannot capture input pictures from the picture capture means 204 at a constant frame rate, thereby time interval between still pictures input from the picture capture means 204 is not smaller than Δt, by using the interruption notification output from the timer 207 every time interval computes the time interval between two continuous still pictures in capturing time of captured pictures without adding time code to the captured picture, and inserts coded data of the two still pictures, i.e., coded data of the number for setting the time interval to be always Δt, between coded data and coded data of the two still pictures. As a result, it is possible to obtain coded data with a required constant frame rate.

As the inserted data, coded data indicating the same picture as previously captured still picture or subsequently captured still picture, which has been produced by predictive coding, is used. Therefore playback of coded data resulting from coding in the moving picture coding apparatus is performed with smooth variations, and it is possible to obtain coded data of high playback quality.

In the fourth embodiment, forward predictive coding and backward predictive coding have been described. Alternatively, it is possible to perform coding by using coded data indicating the same picture as previously captured still picture or subsequently captured still picture, which is produced by one of forward predictive coding, backward predictive coding, and bidirectional predictive coding.

In the moving picture coding apparatuses of the first to fourth embodiment, moving picture coding programs corresponding to respective moving picture coding methods are respectively implemented by executing the program in a general purpose computer system such as a personal computer system. It is also possible to record the moving picture coding program in a recording medium such as a floppy disc or CD-ROM and so forth, or connect it to a network or data communication or the like, thereby executing it using a program in another computer system.

What is claimed is:

1. A method of coding a moving picture in which the moving picture is input and coded to produce coded data, said method comprising:

a picture capturing step for capturing a picture at time n.Δt (n: integer Δt: time interval) of an input moving picture as a still picture and outputting still picture data;

a time information producing step for outputting time information corresponding to time n.Δt when the moving picture is captured as the still picture in the picture capturing step; and a coding step for sequentially capturing and coding the still picture data output in the picture capturing step, computing a time interval-between two continuous still pictures in capturing time of the captured still picture data using the time information output in the time information producing step, and when the computed time interval is m.Δt, (m: integer, m≧2), inserting coded data corresponding to (m−1) or less still pictures between coded data and coded data of the two still pictures so that the time interval between coded still pictures is set to be constant.

2. The method of coding a moving picture as defined in claim 1 wherein, in the coding step, coded data of one of previously captured still picture and subsequently captured still picture of the two still pictures is inserted between the coded data and coded data of the two still pictures.

3. The method of coding a moving picture as defined in claim 1 wherein, in the coding step, combinations of coded data of the two still pictures, corresponding to coded data of plural still pictures are inserted between the coded data and coded data of the two still pictures.

4. The method of coding a moving picture as defined in claim 1 wherein, in the coding step, coded data indicating the same picture as one of the two still pictures, which is produced by at least one of forward predictive coding, backward predictive coding, and bidirectionally predictive coding is inserted between the coded data and coded data of the two still pictures.

5. A method of coding a moving picture in which the moving picture is input and coded to produce coded data, said method comprising:

a time notifying step for notifying time every time interval k.Δt (k: integer);

a picture capturing step for capturing a picture at time n.Δt (n: integer Δt: time interval) of an input moving picture as a still picture and outputting still picture data; and a coding step for sequentially capturing and coding the still picture data output in the picture capturing step, and adding coded data of a still picture behind coded data of a previously captured still picture when there is time notification in the time notifying step while still picture data is being captured.

6. A moving picture coding apparatus in which the moving picture is input and coded to produce coded data, said apparatus comprising:

a picture capture means for capturing a picture at time n.Δt (n: integer Δt: time interval) of an input moving picture as a still picture and outputting still picture data;

a time information producing means for outputting time information corresponding to time n.Δt when the moving picture is captured as the still picture by the picture capture means; and a coding means for sequentially capturing and coding the still picture data output from the picture capture means, computing a time interval between two continuous still pictures in capturing time of the captured still pictures using the time information output from the time information producing means, and when the computed time interval is m.Δt, (m: integer, m≧2), inserting coded data corresponding to (m−1) or less still pictures between coded data and coded data of the two still pictures so that the time interval between coded still pictures is set to be constant.

7. The moving picture coding apparatus as defined in claim 6 wherein, the coding means inserts coded data of one of a previously captured still picture and a subsequently captured still picture of the two still pictures between the coded data and coded data of the two still pictures.

8. The moving picture coding apparatus as defined in claim 6 wherein, the coding means inserts combinations of coded data of the two still pictures, corresponding to coded data of plural still pictures between the coded data and coded data of the two still pictures.

9. The moving picture coding apparatus as defined in claim 6 wherein, the coding means inserts coded data indicating the same picture as one of the two still pictures, which is produced by at least one of forward predictive coding, backward predictive coding, and bidirectionally predictive coding between the coded data and coded data of the two still pictures.

10. A moving picture coding apparatus in which a moving picture is input and coded to produce coded data, said apparatus comprising:

a time notifying means for notifying time every time interval $k.\Delta t$ (k: integer), a picture capture means for capturing a picture at time $n.\Delta t$ (n: integer $\Delta t$: time interval) of an input moving picture as a still picture and outputting still picture data; and a coding means for sequentially capturing and coding the still picture data output from the picture capture means, and adding coded data of a still picture behind coded data of a previously captured still picture when there is time notification from the time notifying means while still picture data is being captured.

11. A recording medium which records a moving picture coding program in which a moving picture is input and coded to produce coded data, said moving picture coding program comprising:

a picture capturing step for capturing a picture at time $n.\Delta t$ (n: integer $\Delta t$: time interval) of an input moving picture as a still picture and outputting still picture data;

a time information producing step for outputting time information corresponding to time $n.\Delta t$ when the moving picture is captured as the still picture in the picture capturing step; and a coding step for sequentially capturing and coding the still picture data output in the picture capturing step, computing a time interval between two continuous still pictures in capturing time of the captured still picture data using the time information output in the time information producing step, and when the computed time interval is $m.\Delta t$, (m: integer, $m \geq 2$), inserting coded data corresponding to (m−1) or less still pictures between coded data and coded data of the two still pictures so that the time interval between coded still pictures is set to ho constant.

12. The recording medium which records a moving picture coding program as defined in claim 11, wherein in the coding step of the recorded moving picture coding program, coded data of one of a previously captured still picture and a subsequently captured still picture of the two still pictures is inserted between the coded data and coded data of the two still pictures.

13. The recording medium which records a moving picture coding program as defined in claim 11, wherein in the coding step of the recorded moving picture coding program, combinations of coded data of the two still pictures, corresponding to coded data of plural still pictures are inserted between coded data and coded data of the two still pictures.

14. The recording medium which records a moving picture coding program as defined in claim 11, wherein in the coding step of the recorded moving picture coding program, coded data indicating the same picture as one of the two still pictures, which is produced by at least one of forward predictive coding, backward predictive coding, and bidirectionally predictive coding is inserted between the coded data and coded data of the two still pictures.

15. A recording medium which records a moving picture coding program in which a moving picture is input and coded to produce coded data, said moving picture coding program comprising:

a time notifying step for notifying time every time interval $k.\Delta t$ (k: integer), a picture capturing step for capturing a picture at time $n.\Delta t$ (n: integer $\Delta t$: time interval) of an input moving picture as a still picture and outputting still picture data; and a coding step for sequentially capturing and coding the still picture data output in the picture capturing step, and adding coded data of a still picture behind coded data of a previously captured still picture when there is time notification in the time notifying step while still picture data is being captured.

16. A method of coding a moving picture in which the moving picture is input and coded to produce coded data comprising:

capturing a picture at a time $n.\Delta t$ (n: integer $\Delta t$: time interval) of an input moving picture as a still picture and outputting still picture data; and sequentially capturing and coding the still picture data, and when a time interval between two continuous still pictures in capturing time of the captured still picture data is $m.\Delta t$ (m: integer, $m \leq 2$), inserting coded data corresponding to (m−1) or less still pictures between coded data and coded data of two still pictures so that the time interval between coded still pictures is set to be constant.

* * * * *